United States Patent [19]

Primo

[11] 4,357,846
[45] Nov. 9, 1982

[54] REAMER FOR HOLLOW SHAFTS

[75] Inventor: Luigi Primo, Genoa Sestri, Italy

[73] Assignee: Ansaldo Societa per Azioni, Italy

[21] Appl. No.: 183,150

[22] Filed: Sep. 2, 1980

[30] Foreign Application Priority Data

Sep. 3, 1979 [IT] Italy .............................. 12721 A/79

[51] Int. Cl.³ .......................... B23B 27/00; B23B 3/26
[52] U.S. Cl. ........................................ 82/1.5; 82/1.2;
82/1.4; 408/129; 408/131; 408/159
[58] Field of Search .................... 82/1.2, 1.3, 1.4, 1.5,
82/12, 4 C, 82; 408/129, 131, 159

[56] References Cited

U.S. PATENT DOCUMENTS

| | | | |
|---|---|---|---|
| 2,383,050 | 8/1945 | Esson | 82/1.4 |
| 2,847,882 | 8/1958 | Benjamin et al. | 82/1.2 |
| 2,880,804 | 4/1959 | Fredd | 82/1.2 |
| 3,854,839 | 12/1974 | Gottelt | 82/1.5 |
| 4,023,451 | 5/1977 | Acton et al. | 82/1.5 |
| 4,084,484 | 4/1978 | Shklyanov et al. | 82/1.2 |
| 4,176,565 | 12/1979 | Christoph | 82/1.2 |

FOREIGN PATENT DOCUMENTS 212192 of 1968 U.S.S.R. .............................. 408/129
511147 of 1976 U.S.S.R. .............................. 82/1.2

Primary Examiner—William R. Briggs
Assistant Examiner—Jerry Kearns
Attorney, Agent, or Firm—Robert E. Burns; Emmanuel J. Lobato; Bruce L. Adams

[57] ABSTRACT

The present invention relates to a reamer for hollow shafts of turbines. Particularly the invention relates to a reamer for hollow shafts, and comprises a casing provided with self-centering means for insertion into the shaft bore, a motor slidable axially inside said casing, means for moving said motor axially, a drive shaft rotated by said motor rigid therewith in its axial movements and keyed to a reaming head which is rotatable relative to said casing but axially fixed relative thereto; the invention further comprises at least one reaming tool rotated by said reaming head, and cam means for guiding said reaming tool along a curved trajector lying in a radial plane of said reaming head and operated by the axial movement of said drive shaft.

10 Claims, 10 Drawing Figures

REAMER FOR HOLLOW SHAFTS

BACKGROUND OF THE INVENTION

It is known that hollow shafts, in particular those designed for rotating at high speed such as the hollow shafts of steam turbines, are subjected to careful inspection, preferably carried out by radiography or ultrasonics, in order to identify any presence in the shaft thickness of blowholes, microcracks and general defects which could give rise to dangerous fracture during service.

When said defects are found in proximity to the inner surface of the hollow shaft, it is possible to remove them by a reaming operation which locally enlarges the inner diameter of the shaft.

In this case, the reamed surface must be suitably joined into the crude inner surface of the surrounding zones in order to prevent any notching effects, which are as dangerous as the defect to be obviated.

OBJECT OF THE INVENTION

The apparatus which at present exists comprises the use of lathes of considerable size in order to enable the hollow shaft to be rotated.

This leads to very high costs and long times required for its arrangement on the machine tool, these being disadvantages which the device of the present invention is required to obviate.

DESCRIPTION OF PREFERRED EMBODIMENTS

Figure 1:
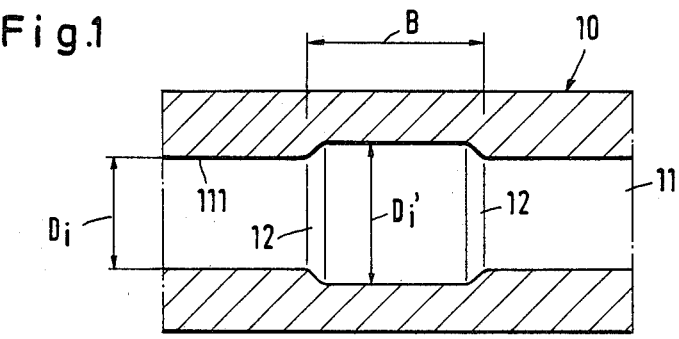
FIG. 1 is a diametrical diagrammatic section through a hollow shaft reamed with a reamer of the described type.
Figure 1A:
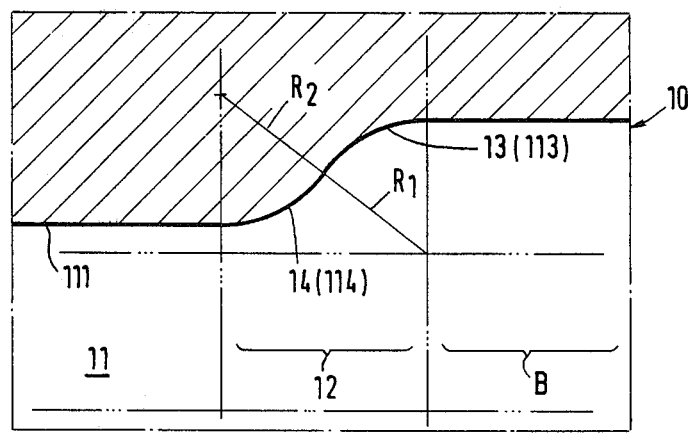
FIG. 1A is an enlarged detail of the preceding FIG. 1.

With particular reference to FIGS. 1 and 1A, the reference numeral 10 indicates very diagrammatically the hollow shaft provided with a through bore 11 of diameter Di, which over a length equal to B has been internally reamed until its inner diameter has reached the value Di'.

Such an operation was made necessary by the presence of a surface defect found by known means for inspecting the surface of the bore.

The reaming of the portion B must obviously be accompanied by suitable shaping of the joining zone between the portion B and the remaining zone of the bore.

This joining zone, obtained according to the invention, is shown in FIG. 1A. In a preferred embodiment of the invention, the joining zone 12 is formed by two toric surfaces 13 and 14, the radial section of which extends through 45° and is constituted by a circular arc. The two toric surfaces 13 and 14 in this case have their radial section in the form of circular arcs 114, 113, of equal angular extent, and have an equal radius R1 and R2.

The convex toric surface 14 is joined at one end to the inner surface 111 of the bore 11 of diameter Di and at the other to the concave toric surface 13 which is joined at its second end to the inner surface of diameter Di' of the reamed zone B.

It is apparent that the angular extents of the arcs 113 and 114 need not be equal in which case the radii R1 and R2 would also not be equal.

In addition, the two concave and convex surfaces 13 and 14 need not have their radial section in the form of circular arcs, even though the embodiment illustrated hereinafter relates to this particular case, which is however non-limiting.

Figure 2:
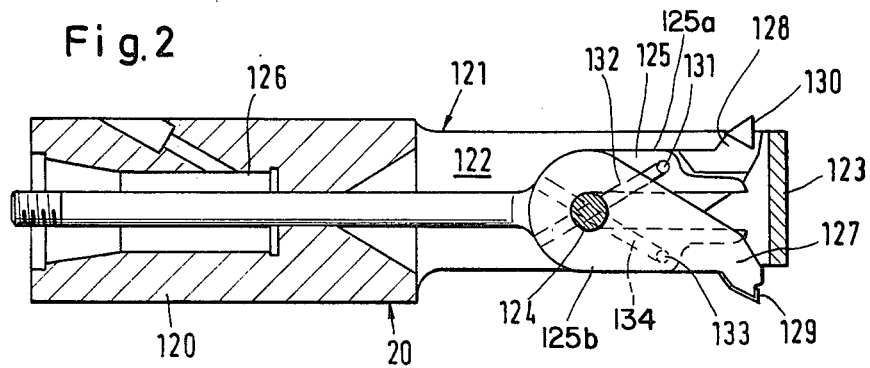
FIG. 2 is a view, partly in diametrical section, of the front end of the device claimed, having mounted on in the reaming head designed to provide concave toric surfaces in the joining zone of the reamed surface.
Figure 3:
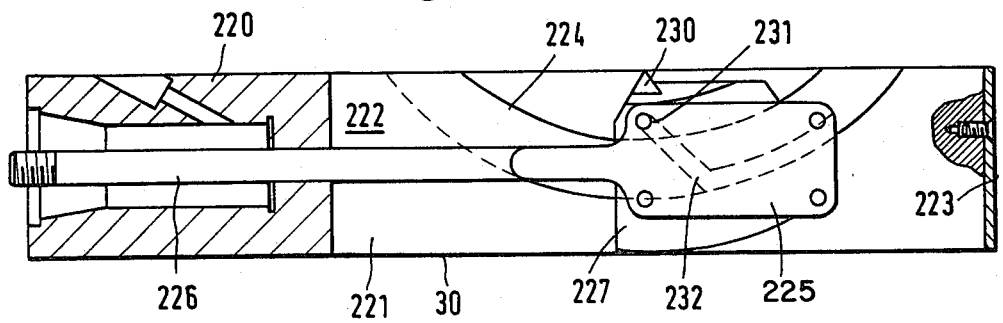
FIG. 3 is analogous to FIG. 2, but shows the device claimed, having mounted on it the reaming head designed to form convex toric surfaces towards the interior of the shaft bore at the joining zone of the reamed part of the shaft.

With particular reference to FIGS. 2 and 3, these show the front tool support head of the reaming device according to the invention.

The two front tool support ends 20 and 30 represent more exactly the tool support head for forming concave toric surfaces (FIG. 2) and for forming convex toric surfaces (FIG. 3) respectively.

These two heads are interchangeable according to the surface to be formed.

If a concave toric surface of the type 13 is to be formed, the head 20 is used, whereas the head 30 is used for forming convex toric surfaces of the type indicated by 14 in FIG. 1A. Finally, it should be noted that, for forming cylindrical surfaces and thus for reaming the bore in the shaft in order to change its inner diameter from the value Di to the value Di' over the length of a portion B as shown in FIG. 1, the head 20 is preferably used, even though for reaming the cylindrical portion other heads can also be used as replacements of those illustrated.

Both the head 20 and the head 30 are rotatable about the longitudinal axis of the device in the manner which will be illustrated hereinafter.

Furthermore, the heads 20 and 30, together with the entire reaming device, can be fed parallel to their axis through predetermined amounts in any known manner. The method of operation of the head 20 will firstly be illustrated.

The head 20 comprises a cylindrical support member 120 suitably rotated about its longitudinal axis. From the front end of the cylindrical support member 120 there projects a U-shaped bracket or stirrup 121 formed from two parallel arms 122 extending longitudinally, and a front cross member 123 obviously shown in section in FIG. 2.

A pin 124 is mounted in the slot or recess defined by the two arms 122 and extends diametrically across the recess.

In addition to the functions explained hereinafter, the pin 124 acts as a guide for a fork 125, which can be seen in FIG. 8 and is partly visible above the pin 124 in FIG. 2, in which the lower part of said fork 125 is shown by a dashed line.

The fork can move forwards and backwards relative to the U stirrup 121, and comprises a control stem 126 which traverses the support member 120 in an axially mobile manner. The stem 126 rotates the support member 120 and the U stirrup 121 simultaneously, by virtue of the presence of the pin 124.

Two arms 127 and 128 are hinged on the pin 124, their ends 129 and 130 supporting mounted plates acting as reaming tools.

The angular position of the two said arms is obviously symmetrical about the axis of the device, and said symmetrical position is defined by cam surfaces provided on the arms 127 and 128 and cooperating with followers disposed on the two faces of the fork 125.

In the case illustrated, the fork 125 comprises a pin 131 projecting from the left hand side of the upper arm 125a of the fork and intended to cooperate with a groove 132 provided in the inner face of the articulated arm 128, this groove acting as a cam surface.

Said groove 132 extends on a straight line which passes through the centre of the pin 124.

Symmetrically, the inner face of the articulated arm 127 comprises a straight-line groove 134 in which a pin 133 can slide, projecting from the right hand face of the lower arm 125b of the fork 125.

The terms "right hand and left hand" and "upper" rod and "lower" rod of the fork 125 as used herefore are naturally relative terms which are valid for the representation as shown in the figures, given that the fork 125 rotates as stated.

The engagement of the pins 131 and 133 in the grooves 132 and 134 defines the angular position of the articulated arms 127 and 128 about the pin 124.

Figure 8:
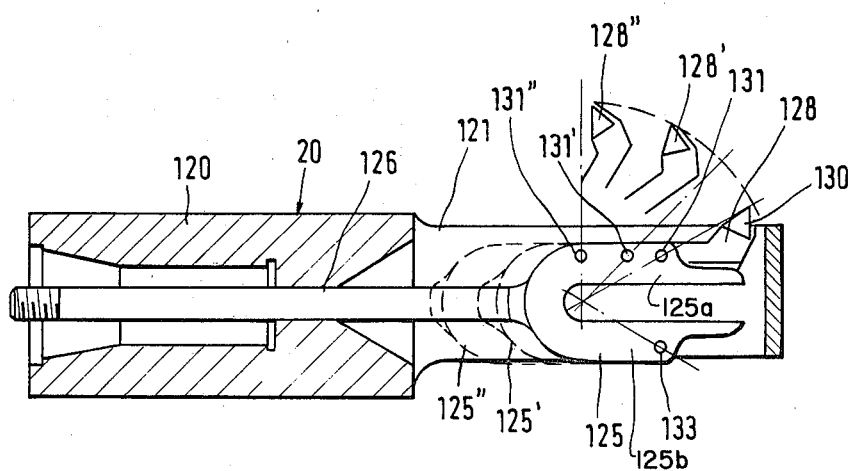
FIG. 8 is analogous to FIG. 2 with some parts removed and with the reaming tool shown in different working positions.

When the fork 125 is urged by the control stem 126 towards the right hand side of FIG. 2 and FIG. 8 into the end position defined by the pin 124 resting in the throat of the fork, the two articulated arms 127 and 128 are angularly close, and their ends 129 and 130 remain within the overall dimensional limits of the support member 120.

When the fork 125 driven by the stem 126 moves to the left, the pins 131 and 133 which slide in the grooves 132 and 134 causes the two arms 127 and 128 to open. This movement is shown for the arm 128 in FIG. 8 by the dashed line, where 128, 128', 128" represent three successive positions of the arm 128, while the arm 127 has been removed to allow illustration of the fork 125 and its two positions 125' and 125" corresponding to the positions 128' and 128" of the arm 128 and positions 131' and 131" of the pin 131.

As can be seen in FIG. 8, the trajectory of the point of the tool 130 disposed at the top of the articulated arm 128 describes an arcuate trajectory with its concavity facing the axis of the device, and thus facing the axis of the shaft bore in which the device has been mounted.

In other words, the trajectory described by the point of the arm 128 describes the concave toric surface 13 of FIG. 1A.

It should be noted that said surface is described by axially moving the stem 126 and thus the fork 125, but maintaining the position of the support member 120 axially fixed.

Figure 9:
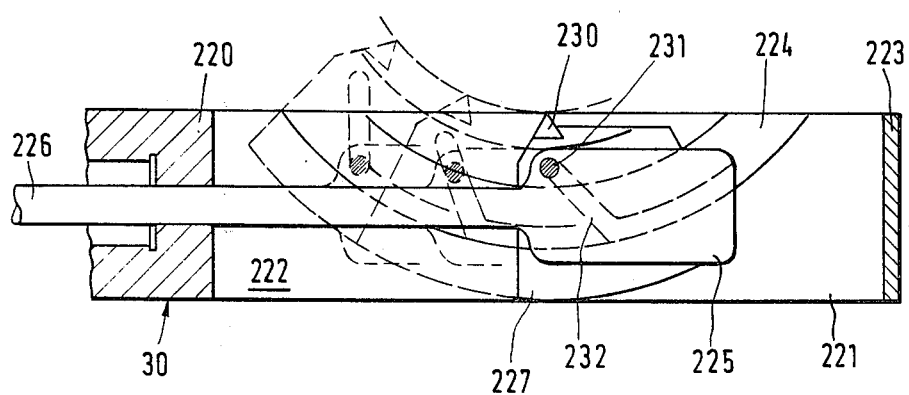
FIG. 9 is analogous to FIG. 8, but relates to the second reaming head, namely that already illustrated in the preceding FIG. 3.

The operation of the reaming head 30 is similar. With particular reference to FIGS. 3 and 9, the head 30 comprises a cylindrical support member 220, from the front face of which there projects a U-shaped stirrup 221 defined by parallel, longitudinal extending arms 222 and by an end cross member 223. The support member 220 is bored and is traversed by a stem 226 axially mobile relative to the support member 220, however it rotates rigidly therewith. In this case, the head 30 is again rotated by rotating the stem 226.

At the front end of the stem 226 there is mounted a plate 225 which is disposed in a recess between the two longitudinally extending arms 222 of the U-shaped stirrup 221. On each of the opposite sides of the plate 225 there is a pin 231 which acts as a follower in a cam device defined by a groove 232 provided in the side of a tool support slide 227. One tool 230 projects upwardly from the slide 227, the axial position of which is defined by the cam elements 231, 232, while the other (not shown) projects downwardly.

The radial position of the tool support slide 227 is defined precisely as a function of its axial position by moving the slide 227 along an arcuate guide 224 provided on the inner faces of the arms 222 of the stirrup 221, in which the slide 227 is mobile.

In the case under examination, said guides 224 extend as an arc of circle with its centre at the centre of the convex curve 114 of FIG. 1A.

It is therefore apparent that when the stem 226 is moved longitudinally and simultaneously rotated, the convex toric surface indicated by 14 in said FIG. 1A becomes turned.

With particular reference to FIGS. 4 to 7, the stem 126, 226 respectively, receives its rotary and translatory motion from a shaft 40.

That end of said shaft at its connection with the stem 126, 226 is provided with a support bearing 41 which uses the inner surface of the tool casing 42 as its fixed track.

Figure 6:
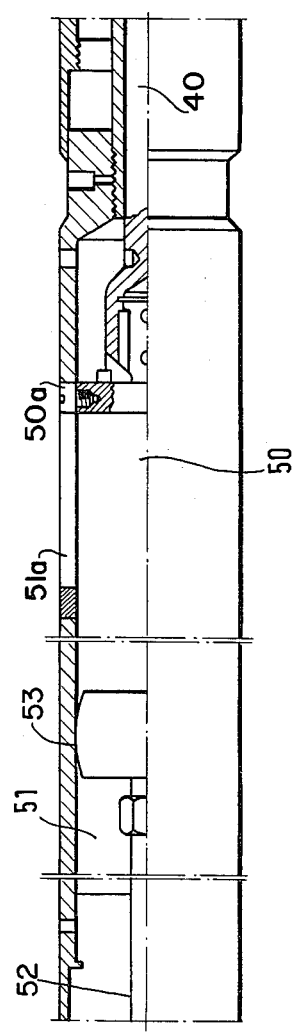
FIGS. 6 and 7 show a fourth and fifth portion of the device in question; it is apparent that the five portions or segments of the device claimed have not been illustrated in a single figure for reasons of size, and in particular to allow them to be more clearly represented.
Figure 7:
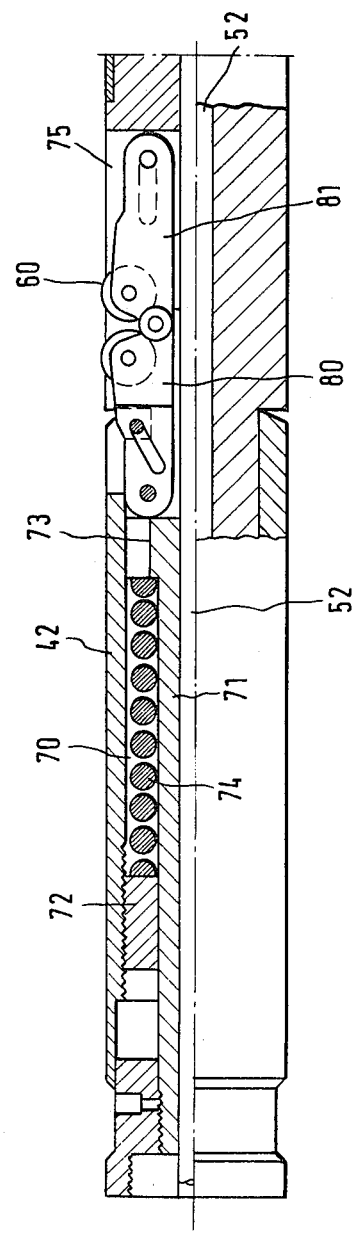

The shaft 40 is rotated by a motor 50, for example an electric, pneumatic or hydraulic motor, which is axially slidable, thus together with the shaft 40 and stem 126, 226, inside a chamber 51 by means of a control rod 52 secured to one end of the motor housing (FIG. 6). The motor housing is guided in its sliding movement by a sliding sleeve 53 and is held against rotation by a screw 52a slidable in a slot 51 in the wall of chamber 51.

Thus whereas the reaming heads 20 and 30 are rotated by the motor 50 by way of the control shaft 40, the relative axial position between the stem 126, 226 and the respective head 20, 30 is defined by the control rod 52.

The tool support casing 42 must obviously be kept perfectly centred relative to the bore to be reamed. For this purpose, groups of three centering wheels 60, preferably disposed in pairs distributed 120° apart around the circumference, are provided at fixed intervals.

Figure 4:
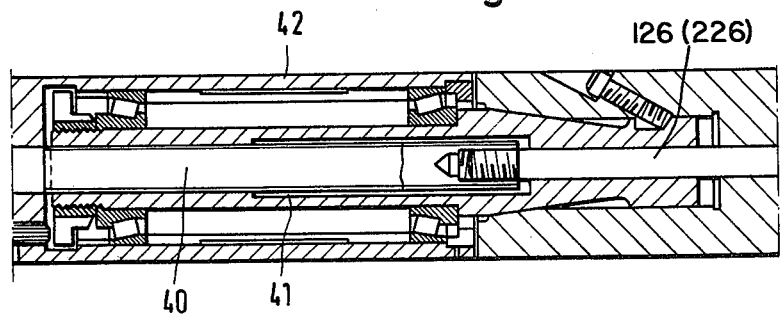
FIG. 4 is a diametrical section through the second portion of the device claimed adjacent to the working end already illustrated in the preceding FIGS. 2 and 3.
Figure 5:
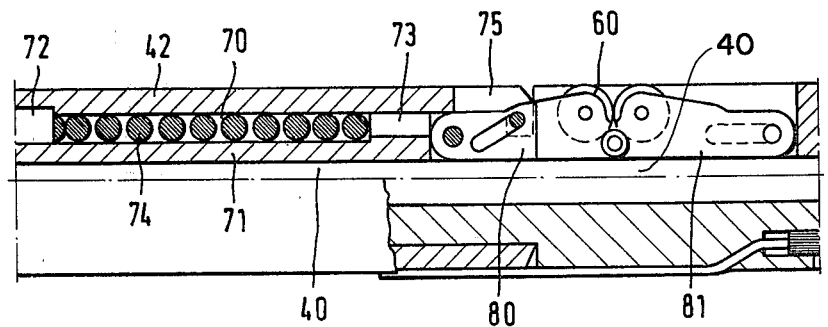
FIG. 5 shows a third portion of the device claimed.

Each group of centering wheels, of which two equal groups are shown in FIGS. 4 to 6, comprises a total of six wheels 60. The wheel support device is formed in the following manner. Inside the casing 42 there is provided an anular chamber 70 defined at its cuter end by the casing wall 42, and at its other end by a sleeve 71 slidable on the control shaft 40 or (see FIG. 6) on the rod 52.

The casing 42 comprises an inner flange 72, while at its other end the slidable sleeve 71 comprises an outer flange 73.

A compressed spiral spring 74 is inserted between said two flanges, for pushing said two flanges away from each other.

Adjacent to the flange of the slidable sleeve, there are provided in the casing 42 three longitudinal slots 75 through which three pairs of articulated arms 80 and 81 can project outwards. The adjacent ends of said arms are hinged together. The other end of the first arm 80 is hinged to the flange 73 of the slidable sleeve 71, while the other end of the second arm 81 is hinged to the casing 42.

Under the action of the spring 74, the adjacent ends of each of said pair of articulated arms 80, tend to project through said slots 75 to the outside of the casing 42.

The wheels 60 are fixed to the adjacent ends of said arms 80, 81, one wheel per arm thus pressed against the wall of the shaft bore, thus centering the reaming device because of the fact that there are three pairs of arms distributed circumferentially.

The aforegoing description of the present invention is given by way of example only, and various modifications and variations can be made to the embodiment of the invention, where modifications and variations are based on the claims given hereinafter.

What I claim is:

1. A reamer for reaming a toric surface in the bore of a hollow shaft, which comprises a cylindrical casing insertable in said bore, means for centering said casing in said bore, a motor slidable axially in said bore and having a shaft coaxial with said bore, means for moving said motor axially of said casing, means for restraining said motor against rotation, a drive shaft rotatable coaxially in said casing and fixed to said motor shaft for rotation by said motor and for movement axially of said casing by axial movement of said motor, a cylindrical reaming head at an end of said casing, said reaming head being fixed axially relative to said casing but rotatable relative thereto by said drive shaft and having a diametrically extending recess, a mounting and actuating member fixed on an end of said drive shaft and disposed in said recess of said reaming head, said mounting and actuating member being rotatable with said reaming head and movable axially of said reaming head by axial movement of said motor and drive shaft relative to said casing, at least one tool holder received in said recess of said reaming head in juxtaposition to said mounting and actuating member, and a cutting tool carried by said tool holder, and cam means actuated by axial movement of said drive shaft and mounting and actuating member relative to said reaming head for moving said tool holder in said recess to move said tool along a path to cut a toric surface in said bore as said reaming head rotates while remaining fixed in an axial direction relative to said bore.

2. A reamer according to claim 1, in which there are two of said tool holders with tools, said tool holder being on opposite sides of said mounting and actuating member and said tools being at diametrically opposite sides of said reaming head.

3. A reamer according to claim 1, in which said tool holder is pivoted on a transverse shaft in said reaming head extending diametrically across said recess, and in which said cam means comprises a cam groove in said tool holder and a pin on said mounting and actuating member engaging in said cam groove, said cam means moving said tool along a path to cut a concave toric surface in said bore.

4. A reamer according to claim 2, in which said tool holders are pivoted on a transverse shaft in said reaming head extending diametrically across said recess, and in which said mounting and actuating member comprises a fork straddling said transverse fork and said cam means comprises cam grooves in said tool holders and pins on opposite arms of said fork engaging in said cam grooves, said cam means moving said tools along paths to cut a concave toric surface in said bore.

5. A reamer according to claim 1 for cutting a convex toric surface in said bore, in which said cam means comprises interengaging arcuate guide surfaces on said tool holder and a side of said recess in said reaming head, said arcuate guide surfaces being concentric with said toric surface to be cut, a cam groove in said tool holder and a pin on said mounting and actuating member engaging in said cam groove to transmit from said mounting and actuating member an axial component of movement of said tool holder guided by said guide surfaces to move said tool along a path to cut said convex toric surface in said bore.

6. A reamer according to claim 2 for cutting a convex toric surface in said bore, in which said mounting and actuating member comprises a plate fixed on an end of said drive shaft and in which said cam means comprises interengaging arcuate guide surfaces on said tool holders and opposite sides of said recess in said reaming head, said guide surfaces being concentric with said toric surface to be cut, a cam groove in each of said tool holders and pins on opposite sides of said plate engaging respectively in said cam grooves to transmit from said mounting and actuating member an axial component of movement of said tool holders guided by said guide surfaces to move said tools along paths to cut said convex surface in said bore.

7. A reamer according to claim 1, in which said means for centering said casing in said bore comprises a group of three carriages mounted on said casing and spaced circumferentially 120° apart and means resiliently pressing said carriages equally towards the wall of said bore to be reamed.

8. A reamer according to claim 7, in which each of said carriages comprises a pair of articulated links having ends pivotally connected with one another and rollers carried by pivotally connected ends of said links and engageable with the wall of said bore.

9. A reamer according to claim 8, in which said resilient pressing means comprises a sleeve slidable on said casing, one end of one link of each pair being pivotally connected with said sleeve, and a spring urging said sleeve axially to press said rollers outwardly towards the wall of said bore.

10. A reamer according to claim 7, in which a plurality of said groups of carriages are disposed at longitudinally spaced positions along said casing.

* * * * *